United States Patent
Link et al.

(10) Patent No.: US 9,395,277 B2
(45) Date of Patent: *Jul. 19, 2016

(54) SELF-ADJUSTING AUDIO DETECTION OF MEDIUM JAM

(71) Applicant: Kodak Alaris Inc., Rochester, NY (US)

(72) Inventors: Bruce A. Link, Rochester, NY (US); Anthony A. Syracuse, Fairport, NY (US); James E. Adams, Jr., Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,171

(22) Filed: Apr. 28, 2014

(65) Prior Publication Data

US 2014/0360275 A1    Dec. 11, 2014

Related U.S. Application Data

(60) Provisional application No. 61/831,654, filed on Jun. 6, 2013.

(51) Int. Cl.
*G01M 99/00* (2011.01)
*B65H 5/06* (2006.01)
(Continued)

(52) U.S. Cl.
CPC ............ *G01M 99/005* (2013.01); *B65H 5/06* (2013.01); *B65H 7/06* (2013.01); *G03G 15/70* (2013.01); *B65H 2511/528* (2013.01); *B65H 2515/82* (2013.01); *B65H 2553/30* (2013.01); *B65H 2557/63* (2013.01); *G03G 2215/00637* (2013.01)

(58) Field of Classification Search
CPC ...... B65H 5/06; B65H 7/06; B65H 2511/528; B65H 2515/82; B65H 2553/30; B65H 2557/63; B65H 2220/01; B65H 2220/03; G03G 15/70; G03G 2215/00637; G01M 99/005
USPC ............................................. 73/646
See application file for complete search history.

(56) References Cited

U.S. PATENT DOCUMENTS

| 4,463,607 | A |   | 8/1984 | Hilton |
| 5,076,102 | A | * | 12/1991 | Sato ............... B23B 49/001 340/680 |
| 5,393,043 | A |   | 2/1995 | Nitta |

(Continued)

FOREIGN PATENT DOCUMENTS

| EP | 1612168 | 4/2006 |
| JP | 2001302021 | 10/2001 |
| JP | 2009113926 | 5/2009 |

OTHER PUBLICATIONS

International Preliminary Report on Patentability issued Dec. 8, 2015 in International Application No. PCT/US2014/041069.

(Continued)

*Primary Examiner* — J M Saint Surin
(74) *Attorney, Agent, or Firm* — Hogan Lovells US LLP

(57) ABSTRACT

A method of indicating a medium misfeed along a medium transport path comprising one or more rollers for conveying the medium along the medium transport path; a microphone for detecting the sound of the conveyed medium and producing a signal representing the sound; a processor for producing sound values from the signal; providing a sensitivity setting responsive to the sound values; and indicating the medium misfeed responsive to the sound values and the sensitivity setting.

11 Claims, 14 Drawing Sheets

(51) Int. Cl.
  *B65H 7/06* (2006.01)
  *G03G 15/00* (2006.01)

(56) References Cited

U.S. PATENT DOCUMENTS

| | | | | |
|---|---|---|---|---|
| 6,026,681 | A * | 2/2000 | Wunderer | G01N 3/34 73/159 |
| 6,524,569 | B1 * | 2/2003 | Stratford | C08K 9/12 424/70.19 |
| 8,864,131 | B2 * | 10/2014 | Hongo | B65H 7/125 271/258.01 |
| 8,925,020 | B2 * | 12/2014 | Mizuno | H04N 21/4331 725/80 |
| 8,955,840 | B2 * | 2/2015 | Shimazu | B65H 7/06 271/258.01 |
| 8,991,820 | B2 * | 3/2015 | Hongo | B65H 7/06 271/265.01 |
| 9,039,010 | B2 * | 5/2015 | Umi | B65H 5/00 271/265.01 |
| 2005/0269759 | A1 | 12/2005 | Sano et al. | |
| 2007/0114716 | A1 * | 5/2007 | Morikawa | B65H 3/5261 271/258.01 |
| 2007/0177887 | A1 * | 8/2007 | Haas | G03G 15/607 399/17 |
| 2012/0235929 | A1 | 9/2012 | Hongo | |

OTHER PUBLICATIONS

Notification of Transmittal of the International Search Report and the Written Opinion of the International Searching Authority, or the Declaration mailed Oct. 1, 2014, in International Application No. PCT/US2014/041069.

* cited by examiner

SELF-ADJUSTING AUDIO DETECTION OF MEDIUM JAM

CROSS-REFERENCE TO RELATED APPLICATION

This application is a non-provisional of 61/831,654 filed Jun. 6, 2013, and entitled: "Self-Adjusting Audio Detection of Medium Jam," by Link et al. Reference is also made to commonly assigned, co-pending U.S. patent application Ser. No. 13/786,502 filed Mar. 6, 2013, entitled: "Audio Detection of Medium Jam", by Adams et al., and commonly assigned U.S. patent application Ser. No. 13/312,601 filed Dec. 16, 2011, entitled: "Sound-Based Damage Detection", by Syracuse et al. The disclosures of the applications listed above are all incorporated herein.

FIELD OF THE INVENTION

This invention pertains to the field of indicating medium jams in a medium transport system and more particularly to a method for detecting and processing sound values in order to indicate a medium jam.

BACKGROUND OF THE INVENTION

It is well known to those skilled in the art that the sound a sheet of paper makes as it moves along a paper transport path is a way of diagnosing the condition of the paper. Quiet or uniform sounds can indicate a normal or problem-free passage of the paper along the paper transport path. Loud or non-uniform sounds can indicate a disruption in the passage of the sheet of paper such as a stoppage due to jamming or tearing or other physical damage of the paper. In commonly assigned U.S. Pat. No. 4,463,607 to Hilton et al., entitled "Apparatus for Detecting the Condition of a Sheet," a paper transport cylinder with a specialized profile is used to enhance the diagnostic qualities of the paper transport noise in order to detect paper wear. The problem with this approach is that the specialized paper transport cylinder is designed to induce stresses into the paper that would interfere with smooth paper transport at high transport speeds. Commonly assigned U.S. Pat. No. 5,393,043 to Nitta, entitled "Image Forming Apparatus with Automatic Paper Supply Mechanism," describes using optical or mechanical sensors in order to detect the times of the passage of a sheet of paper at various locations along the paper transport path. If the paper does not arrive at a given location at a given amount of time after the start of transport, a paper jam is inferred. The problem with this approach is that optical and mechanical sensors are highly localized in physical detection range, requiring the use of several such sensors situated along the paper transport path. Commonly assigned U.S. Patent Application Publication No. 2012/0235929 to Hongo et al, entitled "Paper Feeding Device, Image Scanning Device, Paper Feeding Method and Computer Readable Medium," describes placing a microphone near the beginning of a paper feed path in order to detect the sound of a paper jam in progress. The signal from the microphone is processed by counting the number of sound samples above a given threshold within a sampling window of a given width. If the count is sufficiently large, i.e., above a threshold value, a paper jam is signaled. The problem with this approach is the loss of localized information about the paper as it moves along the transport path as provided by the previously discussed prior art methods. An additional problem with this approach is the lack of automatic adjustment of the threshold value due to factors such as a change in paper type or machine wear.

There remains a need for a fast and robust technique to indicate paper jams along a paper transport path that uses a single paper sensor, processes the signals from the paper sensor simply in a way that incorporates the location of the paper along the paper transport path, and automatically adjusts itself in response to changing paper types and machine wear.

SUMMARY OF THE INVENTION

The present invention represents a method of indicating a medium misfeed along a medium transport path comprising:
one or more rollers for conveying the medium along the medium transport path;
a microphone for detecting the sound of the conveyed medium and producing a signal representing the sound;
a processor for producing sound values from the signal;
providing a sensitivity setting responsive to the sound values; and
indicating the medium misfeed responsive to the sound values and the sensitivity setting.

The present invention has the advantage that a microphone can detect the sound of a medium jamming over a larger physical area than optical or mechanic methods which are localized in nature. As a result, one microphone can replace the need for several optical or mechanic sensors.

The present invention has the additional advantage that it processes sound values over the entire medium transport path and at specific locations along the medium transport path thereby improving medium jam detection accuracy and reliability over many prior art methods.

The present invention has the additional advantage that the sound value processing is simple as it includes computing sums of the sound values produced from the microphone signals. More computationally intensive methods such as transformations into frequency space or signal processing methods such a median filtering are avoided, resulting in sound value processing that requires substantially less computation resources and processing time than many prior art methods.

The present invention has the additional advantage that jam detection sensitivity is automatically adjusted in response to the sustained loudness of normal movement of a medium along a medium transport path. Since the sustained loudness is both a function of the medium type and the medium transport path, the jam detection process automatically adjusts to changes in either, e.g., switching to a new medium type or machine wear.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the signals involved therewith, not specifically shown or described herein can be selected from such systems, algorithms, components, and elements known in the art. Given the system as described according to the invention in the following, software not specifically shown, suggested, or described herein that is useful for implementation of the invention is conventional and within the ordinary skill in such arts.

Figure 1:
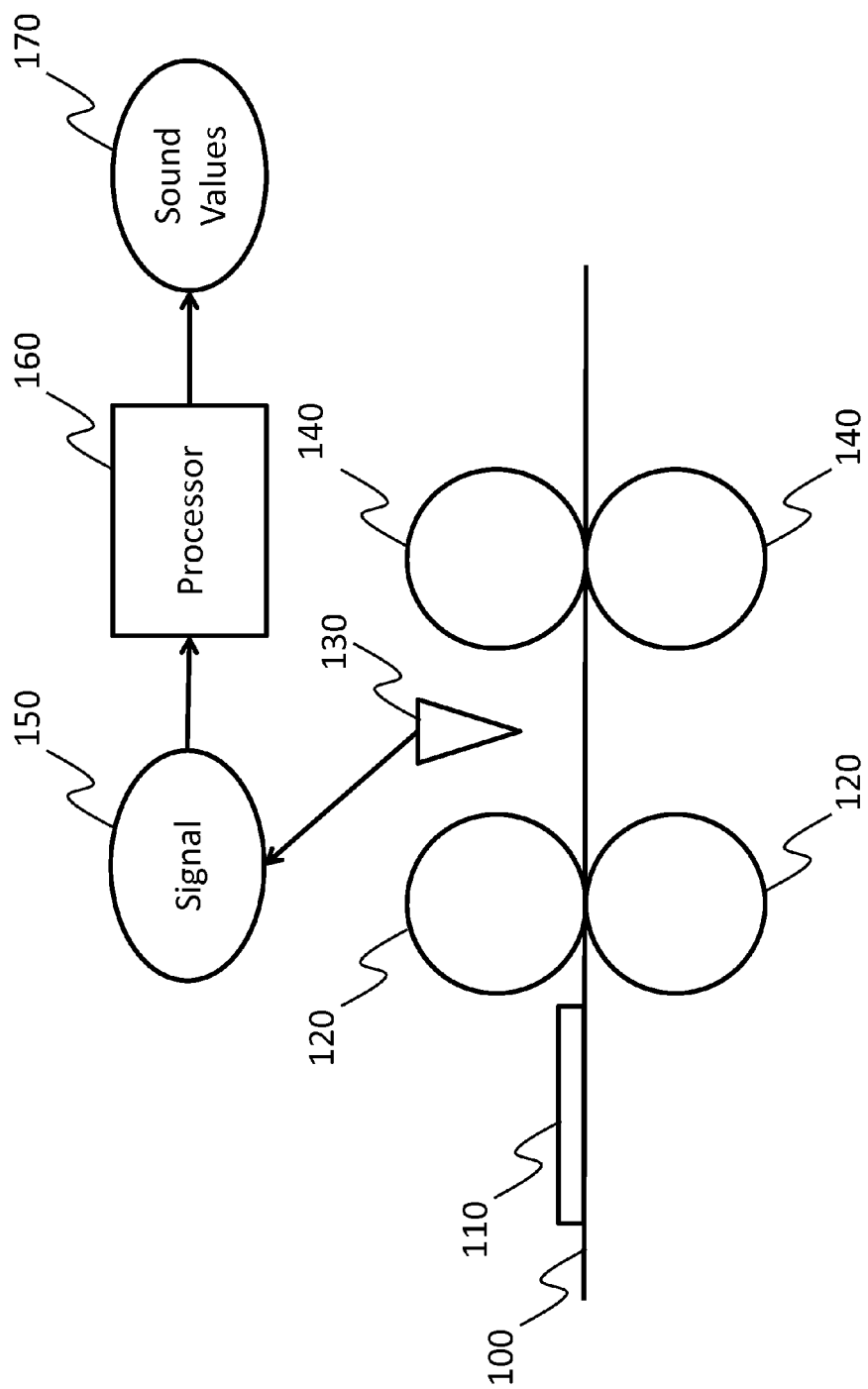
FIG. 1 is a high-level diagram showing the components of a medium transport system according to an embodiment of the present invention.

FIG. 1 is a block diagram of a medium transport system for a preferred embodiment of the present invention. A medium 110 is moved along a medium transport path 100 by a set of rollers collectively referred to as a first roller 120 and a set of rollers collectively referred to as a second roller 140. Examples of the medium 110 are paper, photographic film, and magnetic recording media. Other examples of the medium 110 will be evident to those skilled in the art. A microphone 130 detects the sound of the medium 110 conveyed along the medium transport path 100 and produces a signal 150 representing the sound. Examples of the microphone 130 are audio microphones, electrostatic sensors, and piezoelectric sensors. Other examples of the microphone 130 will be evident to those skilled in the art. A processor 160 produces sound values 170 from the signal 150.

Figure 2:
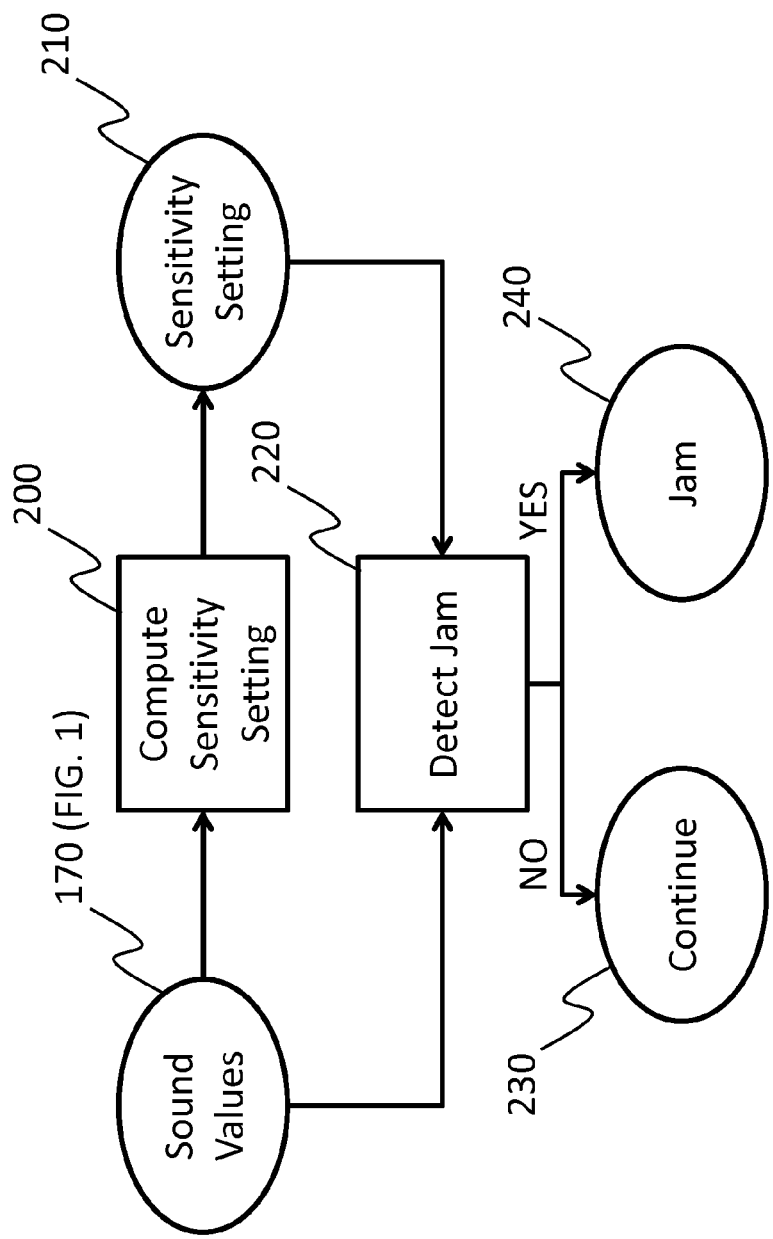
FIG. 2 is a block diagram illustrating a process for indicating a medium jam according to an embodiment of present invention.

FIG. 2 is a flowchart of a signal processing portion of the preferred embodiment of the present invention. A compute sensitivity setting block 200 produces a sensitivity setting 210 from the sound values 170 (FIG. 1). A detect jam block 220 tests the sound values 170 (FIG. 1) with the sensitivity setting 210 and produces a YES result and indicates a jam 240 if a medium jam is detected or a NO result and the medium transport system continues operation 230 if a medium jam is not detected. Examples of a medium jam are stoppages of medium movement along the medium transport path 100 (FIG. 1), multiple sheets of medium 110 (FIG. 1) simultaneously fed into the medium transport path 100 (FIG. 1) designed to convey only single sheets of medium 110 (FIG. 1) at one time, and wrinkling, tearing, or other physical damage to the medium 110 (FIG. 1). Other examples of medium jams will be evident to those skilled in the art.

In FIG. 2 the compute sensitivity setting block 200 produces the sensitivity setting 210 responsive to a sustained loudness value of the sound values 170 (FIG. 1). In the preferred embodiment of the present invention the sustained loudness value is determined from the sound values 170 (FIG. 1) produced by the normal movement (free of jams) of the medium 110 (FIG. 1) before the first roller 120 (FIG. 1). In an alternate embodiment of the present invention the sustained loudness value is determined from the sound values 170 (FIG. 1) produced by the normal movement (free of jams) of the medium 110 (FIG. 1) after the second roller 140 (FIG. 1). Other ways of determining the sustained loudness value will be evident to those skilled in the art. The sensitivity setting 210 is a ratio of a standard loudness value to the sustained loudness value. The standard loudness value is the expected loudness value for a medium transport path 100 (FIG. 1) conveying a medium 110 (FIG. 1) in a normal manner without medium jams.

Figure 3:
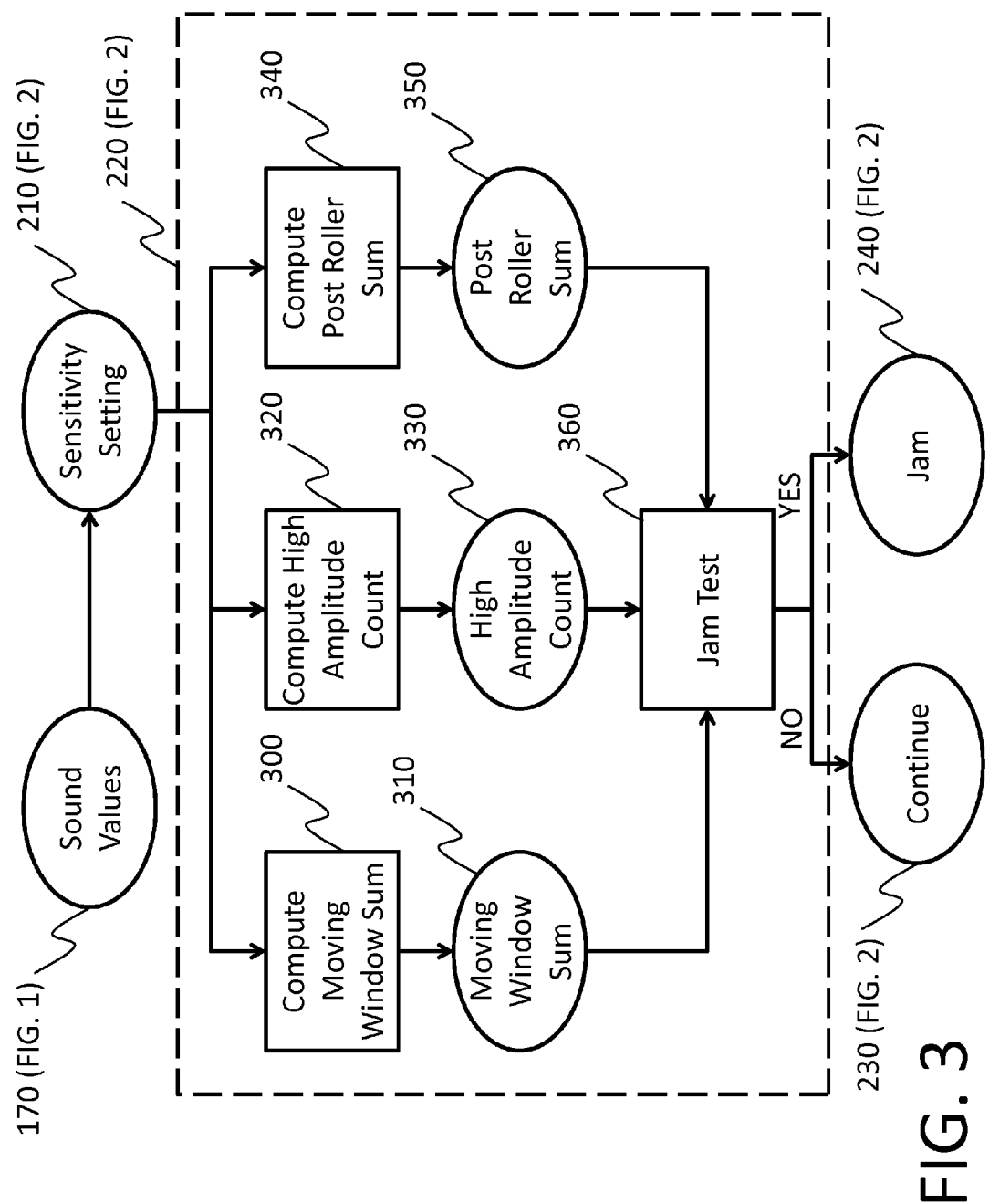
FIG. 3 is a block diagram showing additional details for the detect jam block in FIG. 2.

FIG. 3 is a detailed diagram of the detect jam block 220 (FIG. 2). A compute moving window sum block 300 produces a moving window sum 310 from the sound values 170 (FIG. 1) and the sensitivity setting 210 (FIG. 2). A compute high amplitude count block 320 produces a high amplitude count 330 from the sound values 170 (FIG. 1) and the sensitivity setting 210 (FIG. 2). A compute post roller sum block 340 produces a post roller sum 350 from the sound values 170 (FIG. 1) and the sensitivity setting 210 (FIG. 2). A jam test block 360 tests the moving window sum 310, the high amplitude count 330, and the post roller sum 350 and produces a YES result and indicates a jam 240 (FIG. 2) if a medium jam is detected or a NO result and the medium transport system continues operation 230 (FIG. 2) if a medium jam is not detected.

Figure 4:
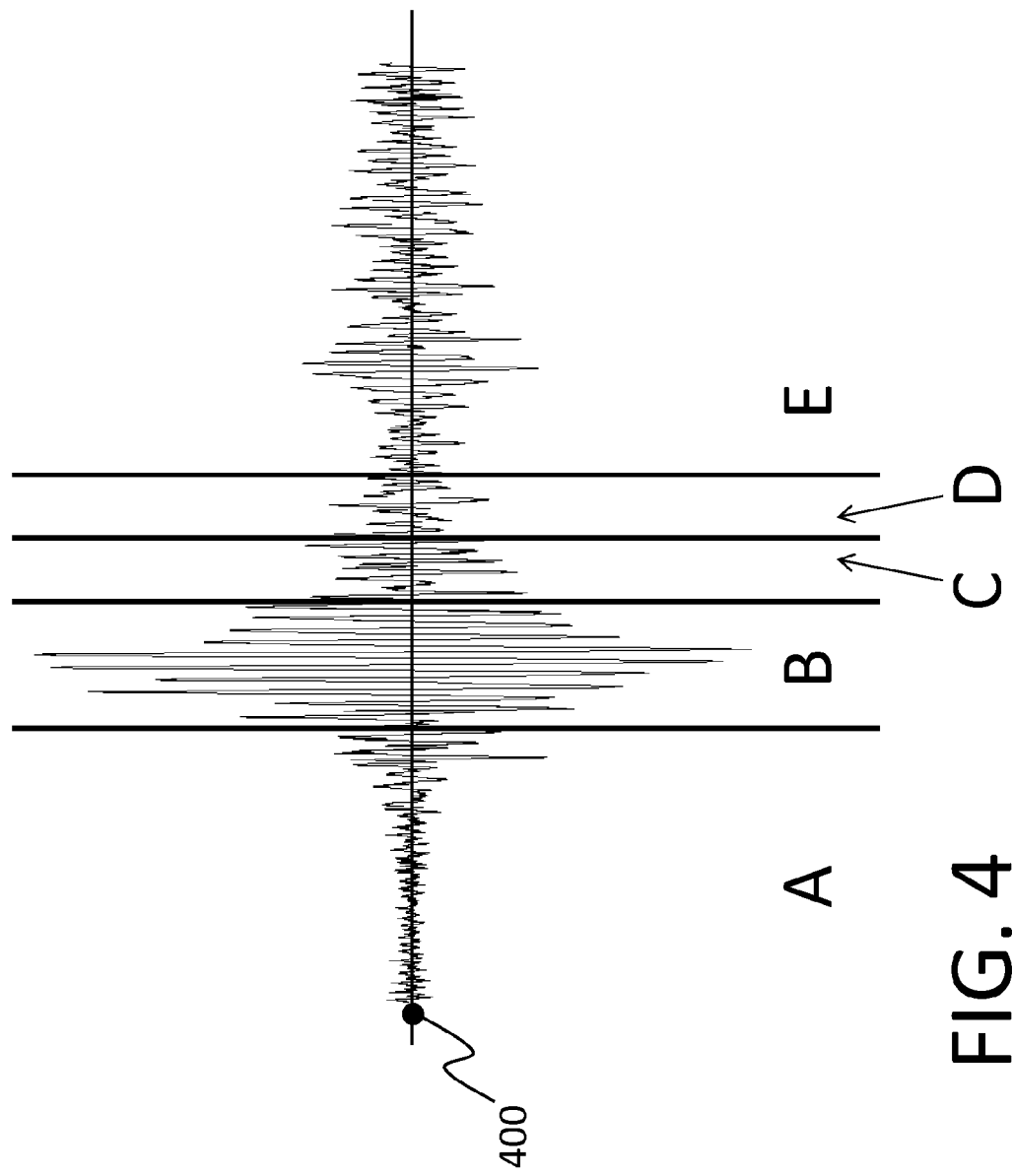
FIG. 4 is an example of the sound values in FIG. 1.

FIG. 4 is an example of a set of sound values 170 (FIG. 1) produces by a normal passage of the medium 110 (FIG. 1) along the medium transport path 100 (FIG. 1). Detection of the sound of the medium 110 (FIG. 1) by the microphone 130 (FIG. 1) begins at a signal start 400 in FIG. 4. Region A in FIG. 4 corresponds to the medium 110 (FIG. 1) passing from the first roller 120 (FIG. 1) to the second roller 140 (FIG. 1). Region B in FIG. 4 corresponds to the medium 110 (FIG. 1) near the second roller 140 (FIG. 1). Region C in FIG. 4 corresponds to the medium 110 (FIG. 1) after it passes the second roller 140 (FIG. 1). Region D in FIG. 4 corresponds to the medium 110 (FIG. 1) after it passes Region C. Region E in FIG. 4 corresponds to the medium 110 (FIG. 1) after it passes Region D.

In FIG. 3 the compute moving window sum block 300 computes a sum of the most recent $N_1$ sound values 170 (FIG. 1) scaled by the sensitivity setting 210 (FIG. 2) where $N_1$ is typically a thousand. The moving sum calculation begins at the signal start 400 (FIG. 4) and continues until a medium jam is detected or the end of the sound values 170 (FIG. 1) has been reached. The compute high amplitude count block 320 counts the number of sound values 170 (FIG. 1) scaled by the sensitivity setting 210 (FIG. 2) greater than a high amplitude threshold where the high amplitude threshold is set to be higher than a majority of the sound values 170 (FIG. 1) scaled by the sensitivity setting 210 (FIG. 2) produced by a normal passage of the medium 110 (FIG. 1) along the medium transport path 100 (FIG. 1). The high amplitude count begins at the signal start 400 (FIG. 4) and continues until a medium jam is detected or the end of the sound values 170 (FIG. 1) has been reached. The compute post roller sum block 340 computes at least one sum of sound values 170 (FIG. 1) scaled by the sensitivity setting 210 (FIG. 2) corresponding to Regions C, D, and E in FIG. 4. In the preferred embodiment of the present invention the compute post roller sum block 340 computes three sums of sound values 170 (FIG. 1) scaled by the sensitivity setting 210 (FIG. 2). The compute post roller sum block 340 computes a first post roller sum by computing a sum of the sound values 170 (FIG. 1) scaled by the sensitivity setting 210 (FIG. 2) corresponding to Region C in FIG. 4. Region C in FIG. 4 typically includes 500 sound values 170 (FIG. 1). The compute post roller sum block 340 computes a second post roller sum by computing a sum of the sound values 170 (FIG. 1) scaled by the sensitivity setting 210 (FIG. 2) corresponding to Region D in FIG. 4. Region D in FIG. 4 typically includes 500 sound values 170 (FIG. 1). The compute post roller sum block 340 computes a third post roller sum by computing a moving sum of the most recent $N_2$ sound values 170 (FIG. 1) scaled by the sensitivity setting 210 (FIG. 2) within Regions C, D, and E in FIG. 4 where $N_2$ is typically 500.

Figure 5:
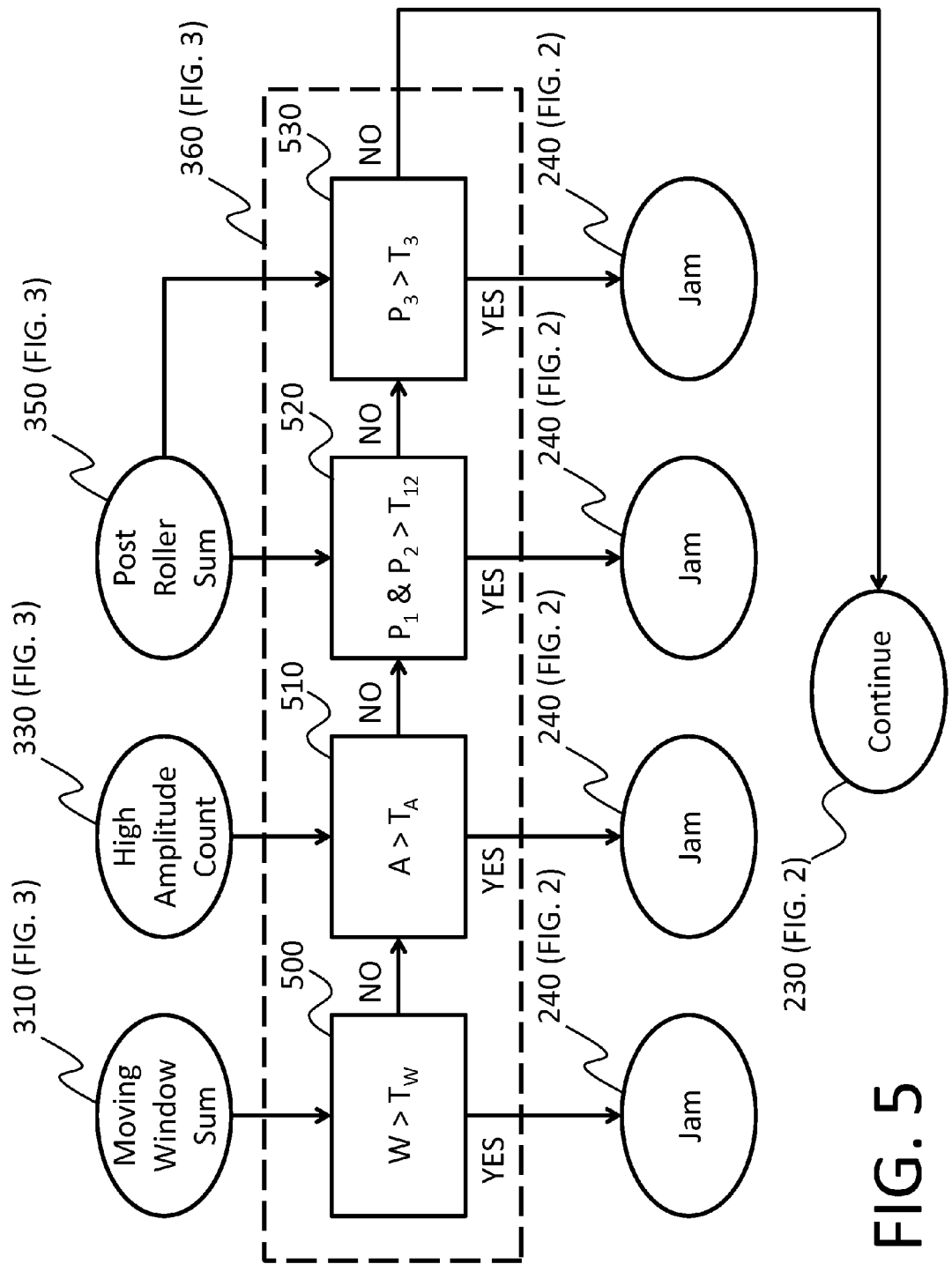
FIG. 5 is a block diagram showing additional details for the jam test block in FIG. 3.

FIG. 5 is a detailed diagram of the jam test block 360 (FIG. 3). Block 500 compares the moving window sum, W, 310 (FIG. 3) to a moving window sum threshold, $T_W$. If the moving window sum, W, 310 (FIG. 3) is greater than the moving window sum threshold, $T_W$, a jam 240 (FIG. 2) is indicated. If the moving window sum, W, 310 (FIG. 3) is not greater than the moving window sum threshold, $T_W$, then block 510 compares the high amplitude count, A, 330 (FIG. 3) to a high amplitude count threshold, $T_A$. If the high amplitude count, A, 330 (FIG. 3) is greater than the high amplitude count threshold, $T_A$, a jam 240 (FIG. 2) is indicated. If the high amplitude count, A, 330 (FIG. 3) is not greater than the high amplitude count threshold, $T_A$, then block 520 compares the first post roller sum, $P_1$, of the post roller sum 350 (FIG. 3) and the second post roller sum, $P_2$, of the post roller sum 350 (FIG. 3) to a first post roller sum threshold, $T_{12}$. If the first post roller sum, $P_1$, of the post roller sum 350 (FIG. 3) and the second post roller sum, $P_2$, of the post roller sum 350 (FIG. 3) are greater than the first post roller sum threshold, $T_{12}$, a jam 240 (FIG. 2) is indicated. If the first post roller sum, $P_1$, of the post roller sum 350 (FIG. 3) or the second post roller sum, $P_2$, of the post roller sum 350 (FIG. 3) is not greater than the first post roller sum threshold, $T_{12}$, then block 530 compares the third post roller sum, $P_3$, of the post roller sum 350 (FIG. 3) to a second post roller sum threshold, $T_3$. If the third post roller sum, $P_3$, of the post roller sum 350 (FIG. 3) is greater than the second post roller sum threshold, $T_3$, a jam 240 (FIG. 2) is indicated. If the third post roller sum, $P_3$, of the post roller sum 350 (FIG. 3) is not greater than the second post roller sum threshold, $T_3$, then the medium transport system continues operation 230 (FIG. 2).

Figure 6:
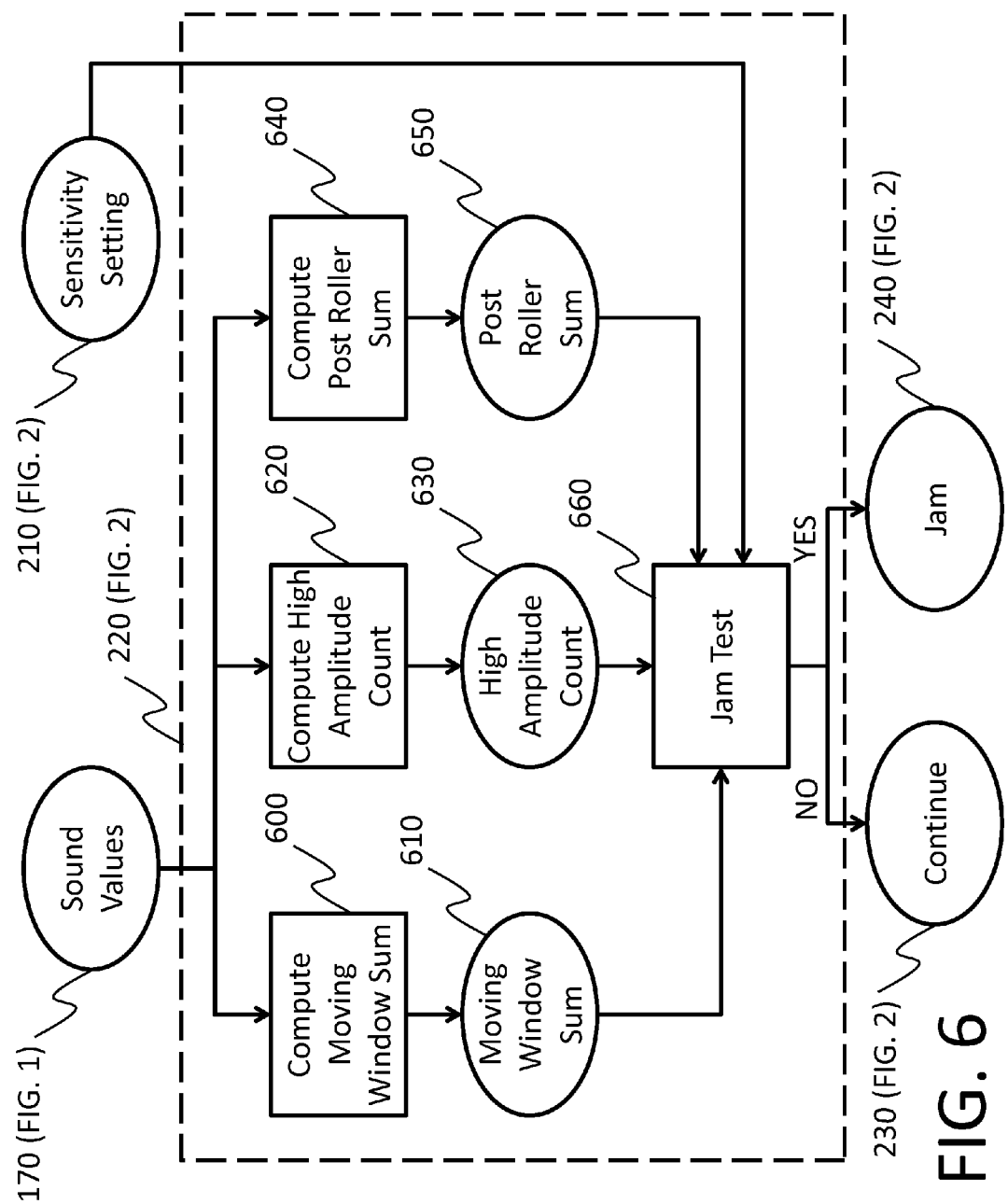
FIG. 6 is a block diagram showing additional details for the detect jam block in FIG. 2 according to an alternate embodiment of present invention.

FIG. 6 is a detailed diagram of the detect jam block 220 (FIG. 2) for an alternate embodiment of the present invention. A compute moving window sum block 600 produces a moving window sum 610 from the sound values 170 (FIG. 1). A compute high amplitude count block 620 produces a high amplitude count 630 from the sound values 170 (FIG. 1). A compute post roller sum block 640 produces a post roller sum 650 from the sound values 170 (FIG. 1). A jam test block 660 tests the moving window sum 610, the high amplitude count 630, and the post roller sum 650 with the sensitivity setting 210 (FIG. 2) and produces a YES result and indicates a jam 240 (FIG. 2) if a medium jam is detected or a NO result and the medium transport system continues operation 230 (FIG. 2) if a medium jam is not detected.

In FIG. 6 the compute moving window sum block 600 computes a sum of the most recent $N_1$ sound values 170 (FIG. 1) where $N_1$ is typically a thousand. The moving sum calculation begins at the signal start 400 (FIG. 4) and continues until a medium jam is detected or the end of the sound values 170 (FIG. 1) has been reached. The compute high amplitude count block 620 counts the number of sound values 170 (FIG. 1) greater than a high amplitude threshold where the high amplitude threshold is set to be higher than a majority of the sound values 170 (FIG. 1) produced by a normal passage of the medium 110 (FIG. 1) along the medium transport path 100 (FIG. 1). The high amplitude count begins at the signal start 400 (FIG. 4) and continues until a medium jam is detected or the end of the sound values 170 (FIG. 1) has been reached. The compute post roller sum block 640 computes at least one sum of sound values 170 (FIG. 1) corresponding to Regions C, D, and E in FIG. 4. In the preferred embodiment of the present invention the compute post roller sum block 640 computes three sums of sound values 170 (FIG. 1). The compute post roller sum block 640 computes a first post roller sum by computing a sum of the sound values 170 (FIG. 1) corresponding to Region C in FIG. 4. Region C in FIG. 4 typically includes 500 sound values 170 (FIG. 1). The compute post roller sum block 640 computes a second post roller sum by computing a sum of the sound values 170 (FIG. 1) corresponding to Region D in FIG. 4. Region D in FIG. 4 typically includes 500 sound values 170 (FIG. 1). The compute post roller sum block 640 computes a third post roller sum by computing a moving sum of the most recent $N_2$ sound values 170 (FIG. 1) within Regions C, D, and E in FIG. 4 where $N_2$ is typically 500.

Figure 7:
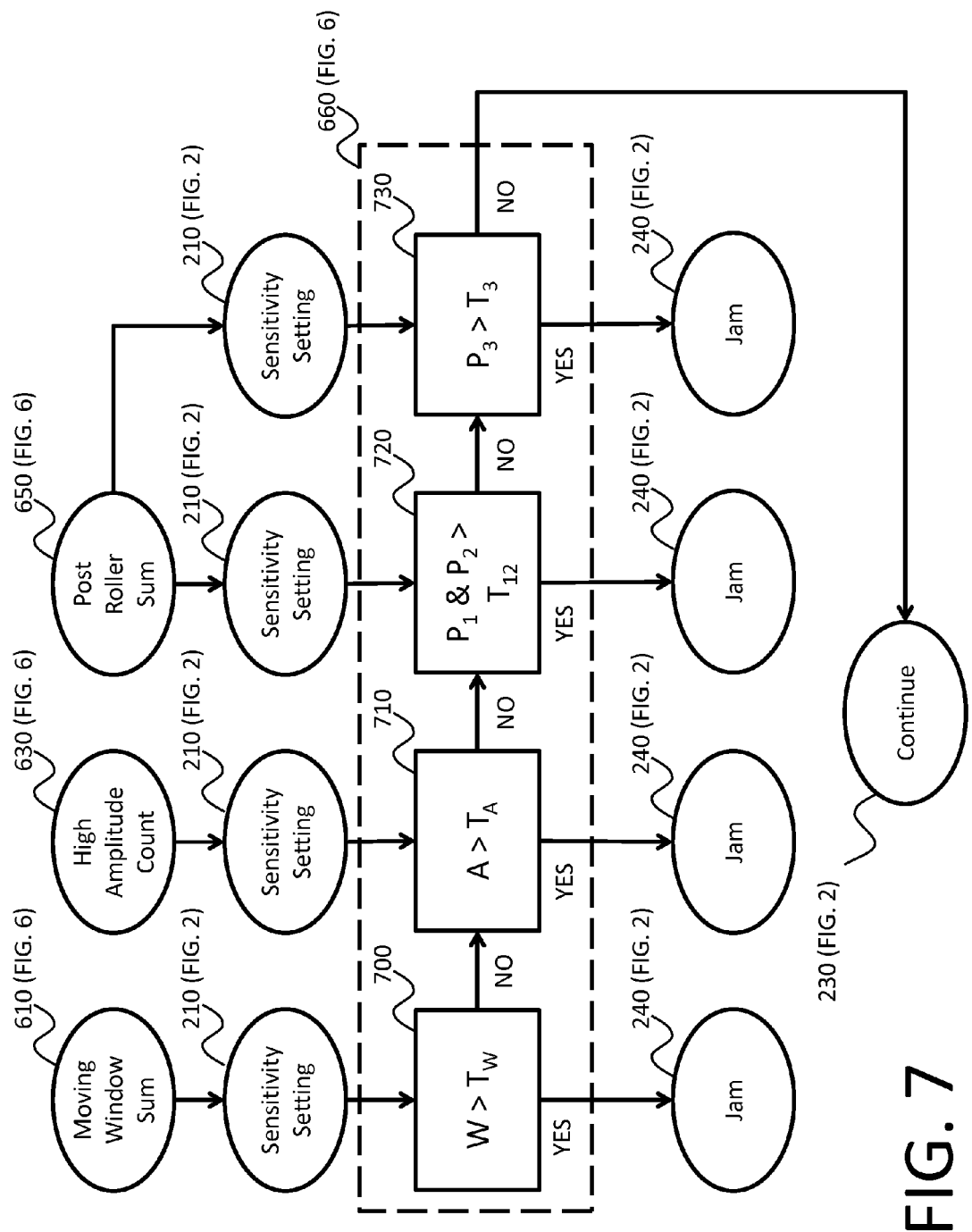
FIG. 7 is a block diagram showing additional details for the jam test block in FIG. 6.

FIG. 7 is a detailed diagram of the jam test block 660 (FIG. 6). Block 700 compares the moving window sum, W, 610 (FIG. 6) to a moving window sum threshold, $T_W$, scaled by the sensitivity setting 210 (FIG. 2). If the moving window sum, W, 610 (FIG. 6) is greater than the moving window sum threshold, $T_W$, scaled by the sensitivity setting 210 (FIG. 2), a jam 240 (FIG. 2) is indicated. If the moving window sum, W, 610 (FIG. 6) is not greater than the moving window sum threshold, $T_W$, scaled by the sensitivity setting 210 (FIG. 2), then block 710 compares the high amplitude count, A, 630 (FIG. 6) to a high amplitude count threshold, $T_A$, scaled by the sensitivity setting 210 (FIG. 2). If the high amplitude count, A, 630 (FIG. 6) is greater than the high amplitude count threshold, $T_A$, scaled by the sensitivity setting 210 (FIG. 2), a jam 240 (FIG. 2) is indicated. If the high amplitude count, A, 630 (FIG. 6) is not greater than the high amplitude count threshold, $T_A$, scaled by the sensitivity setting 210 (FIG. 2), then block 720 compares the first post roller sum, $P_1$, of the post roller sum 650 (FIG. 6) and the second post roller sum, $P_2$, of the post roller sum 650 (FIG. 6) to a first post roller sum threshold, $T_{12}$, scaled by the sensitivity setting 210 (FIG. 2). If the first post roller sum, $P_1$, of the post roller sum 650 (FIG. 6) and the second post roller sum, $P_2$, of the post roller sum 650 (FIG. 6) are greater than the first post roller sum threshold, $T_{12}$, scaled by the sensitivity setting 210 (FIG. 2), a jam 240 (FIG. 2) is indicated. If the first post roller sum, $P_1$, of the post roller sum 650 (FIG. 6) or the second post roller sum, $P_2$, of the post roller sum 650 (FIG. 6) is not greater than the first post roller sum threshold, $T_{12}$, scaled by the sensitivity setting 210 (FIG. 2), then block 730 compares the third post roller sum, $P_3$, of the post roller sum 650 (FIG. 6) to a second post roller sum threshold, $T_3$, scaled by the sensitivity setting 210 (FIG. 2). If the third post roller sum, $P_3$, of the post roller sum 650 (FIG. 6) is greater than the second post roller sum threshold, $T_3$, scaled by the sensitivity setting 210 (FIG. 2), a jam 240 (FIG. 2) is indicated. If the third post roller sum, $P_3$, of the post roller sum 650 (FIG. 6) is not greater than the second post roller sum threshold, $T_3$, scaled by the sensitivity setting 210 (FIG. 2), then the medium transport system continues operation 230 (FIG. 2).

Figure 8:
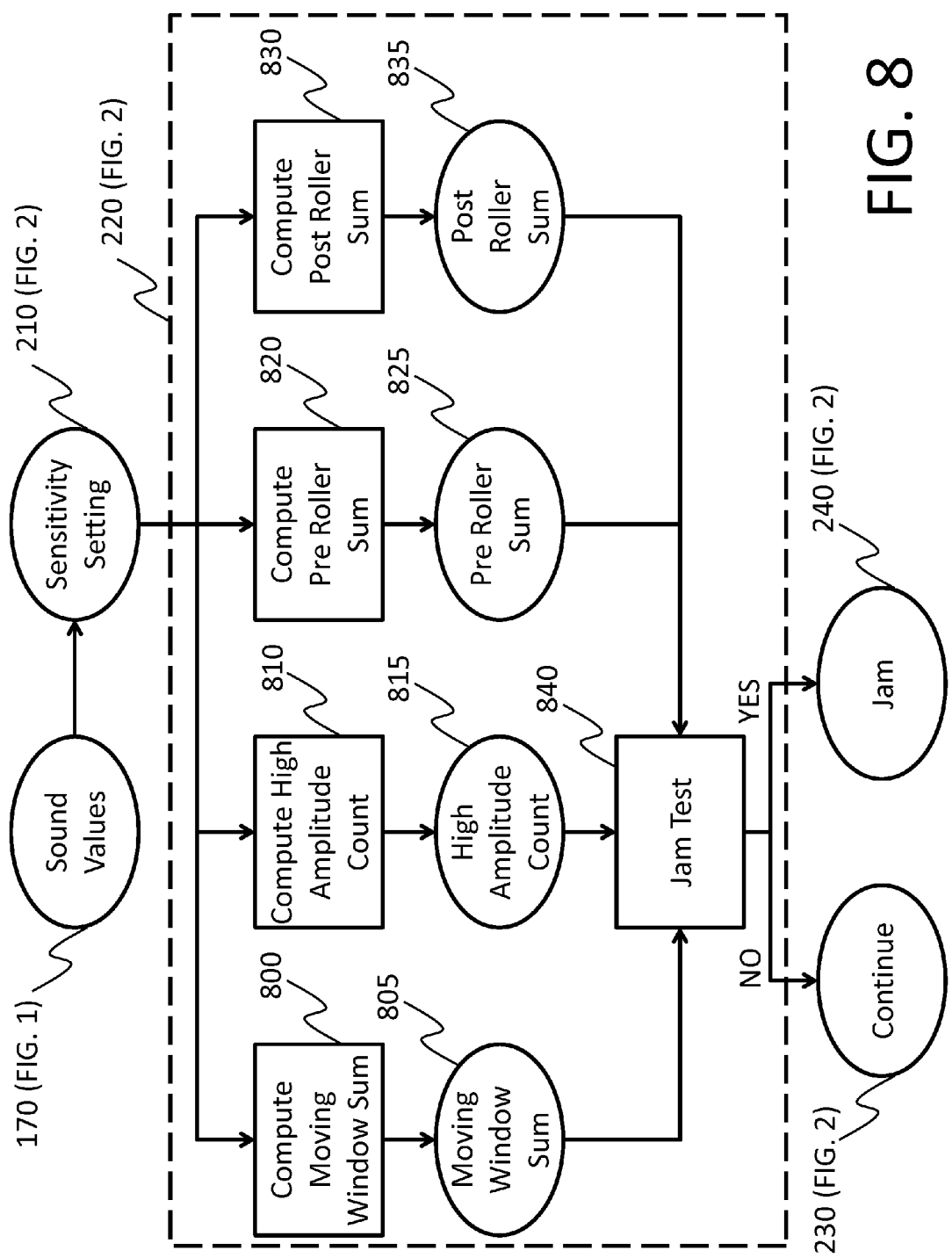
FIG. 8 is a block diagram showing additional details for the detect jam block in FIG. 2 according to an alternate embodiment of present invention.

FIG. 8 is a detailed diagram of the detect jam block 220 (FIG. 2) for an alternate embodiment of the present invention. A compute moving window sum block 800 produces a moving window sum 805 from the sound values 170 (FIG. 1) and the sensitivity setting 210 (FIG. 2). A compute high amplitude count block 810 produces a high amplitude count 815 from the sound values 170 (FIG. 1) and the sensitivity setting 210 (FIG. 2). A compute pre roller sum block 820 produces a pre roller sum 825 from the sound values 170 (FIG. 1) and the sensitivity setting 210 (FIG. 2). A compute post roller sum block 830 produces a post roller sum 835 from the sound values 170 (FIG. 1) and the sensitivity setting 210 (FIG. 2). A jam test block 840 tests the moving window sum 805, the high amplitude count 815, the pre roller sum 825, and the post roller sum 835 and produces a YES result and indicates a jam 240 (FIG. 2) if a medium jam is detected or a NO result and the medium transport system continues operation 230 (FIG. 2) if a medium jam is not detected.

In FIG. 8 the compute moving window sum block 800 is as the previously described compute moving window sum block 300 (FIG. 3). The compute high amplitude count block 810 is as the previously described compute high amplitude count block 320 (FIG. 3). The compute pre roller sum block 820 computes the pre roller sum 825 by computing a moving sum of the most recent $N_3$ sound values 170 (FIG. 1) scaled by the sensitivity setting 210 (FIG. 2) within Region A in FIG. 4 where $N_3$ is typically 500. The compute post roller sum block 830 is as the previously described compute post roller sum block 340 (FIG. 3).

Figure 9:
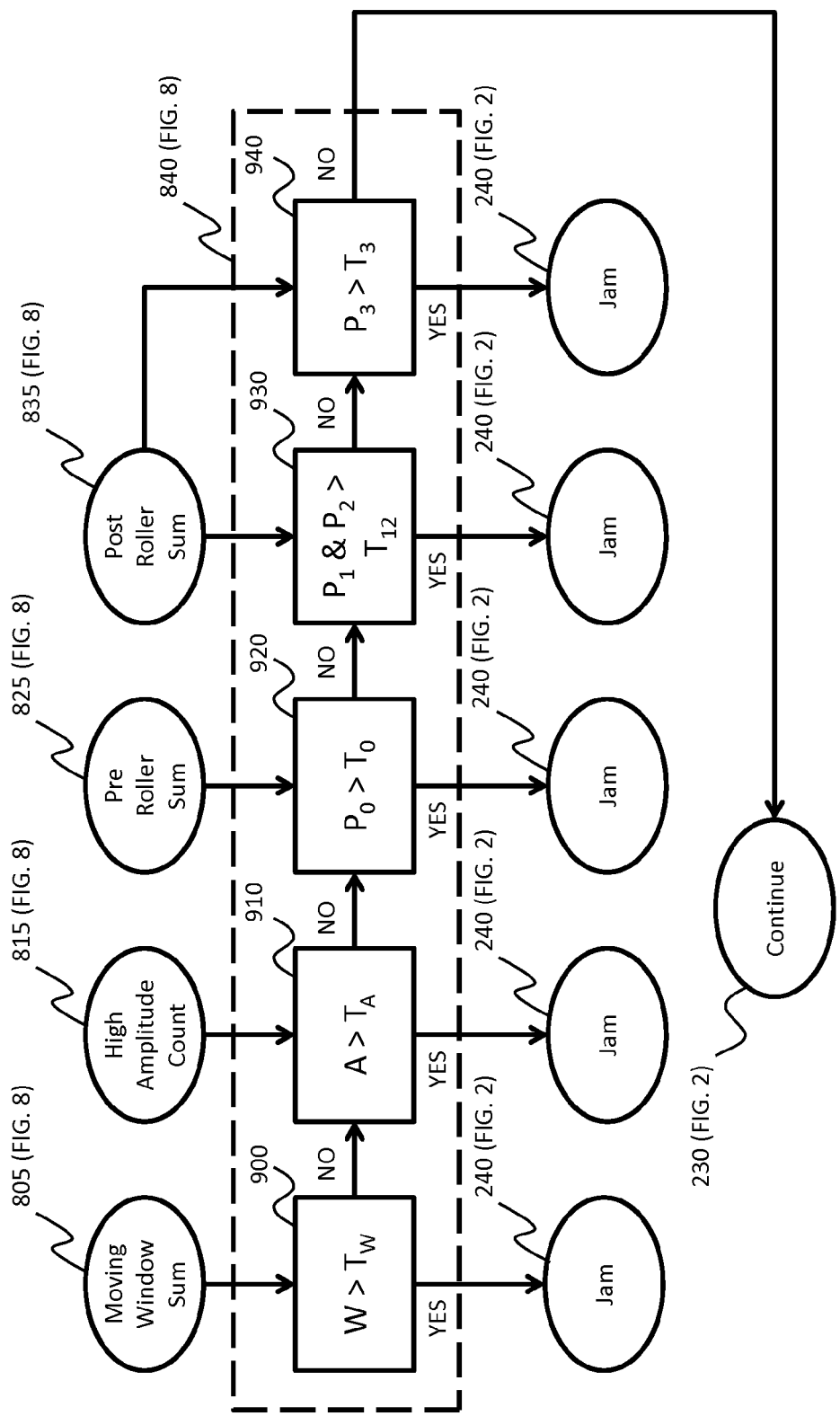
FIG. 9 is a block diagram showing additional details for the jam test block in FIG. 8.

FIG. 9 is a detailed diagram of the jam test block 840 (FIG. 8). Block 900 compares the moving window sum, W, 805 (FIG. 8) to a moving window sum threshold, $T_W$. If the moving window sum, W, 805 (FIG. 8) is greater than the moving window sum threshold, $T_W$, a jam 240 (FIG. 2) is indicated. If the moving window sum, W, 805 (FIG. 8) is not greater than the moving window sum threshold, $T_W$, then block 910 compares the high amplitude count, A, 815 (FIG. 8) to a high amplitude count threshold, $T_A$. If the high amplitude count, A, 815 (FIG. 8) is greater than the high amplitude count threshold, $T_A$, a jam 240 (FIG. 2) is indicated. If the high amplitude count, A, 815 (FIG. 8) is not greater than the high amplitude count threshold, $T_A$, then block 920 compares the pre roller sum 825 (FIG. 8) to a pre roller sum threshold, $T_0$. If the pre roller sum 825 (FIG. 8) is greater than the pre roller sum threshold, $T_0$, a jam 240 (FIG. 2) is indicated. If the pre roller sum 825 (FIG. 8) is not greater than the pre roller sum threshold, $T_0$, then block 930 compares the first post roller sum, $P_1$, of the post roller sum 835 (FIG. 8) and the second post roller sum, $P_2$, of the post roller sum 835 (FIG. 8) to a first post roller sum threshold, $T_{12}$. If the first post roller sum, $P_1$, of the post roller sum 835 (FIG. 8) and the second post roller sum, $P_2$, of the post roller sum 835 (FIG. 8) are greater than the first post roller sum threshold, $T_{12}$, a jam 240 (FIG. 2) is indicated. If the first post roller sum, $P_1$, of the post roller sum 835 (FIG. 8) or the second post roller sum, $P_2$, of the post roller sum 835 (FIG. 8) are not greater than the first post roller sum threshold, $T_{12}$, then block 940 compares the third post roller sum, $P_3$, of the post roller sum 835 (FIG. 8) to a second post roller sum threshold, $T_3$. If the third post roller sum, $P_3$, of the post roller sum 835 (FIG. 8) is greater than the second post roller sum threshold, $T_3$, a jam 240 (FIG. 2) is indicated. If the third post roller sum, $P_3$, of the post roller sum 835 (FIG. 8) is not greater than the second post roller sum threshold, $T_3$, then the medium transport system continues operation 230 (FIG. 2).

Figure 10:
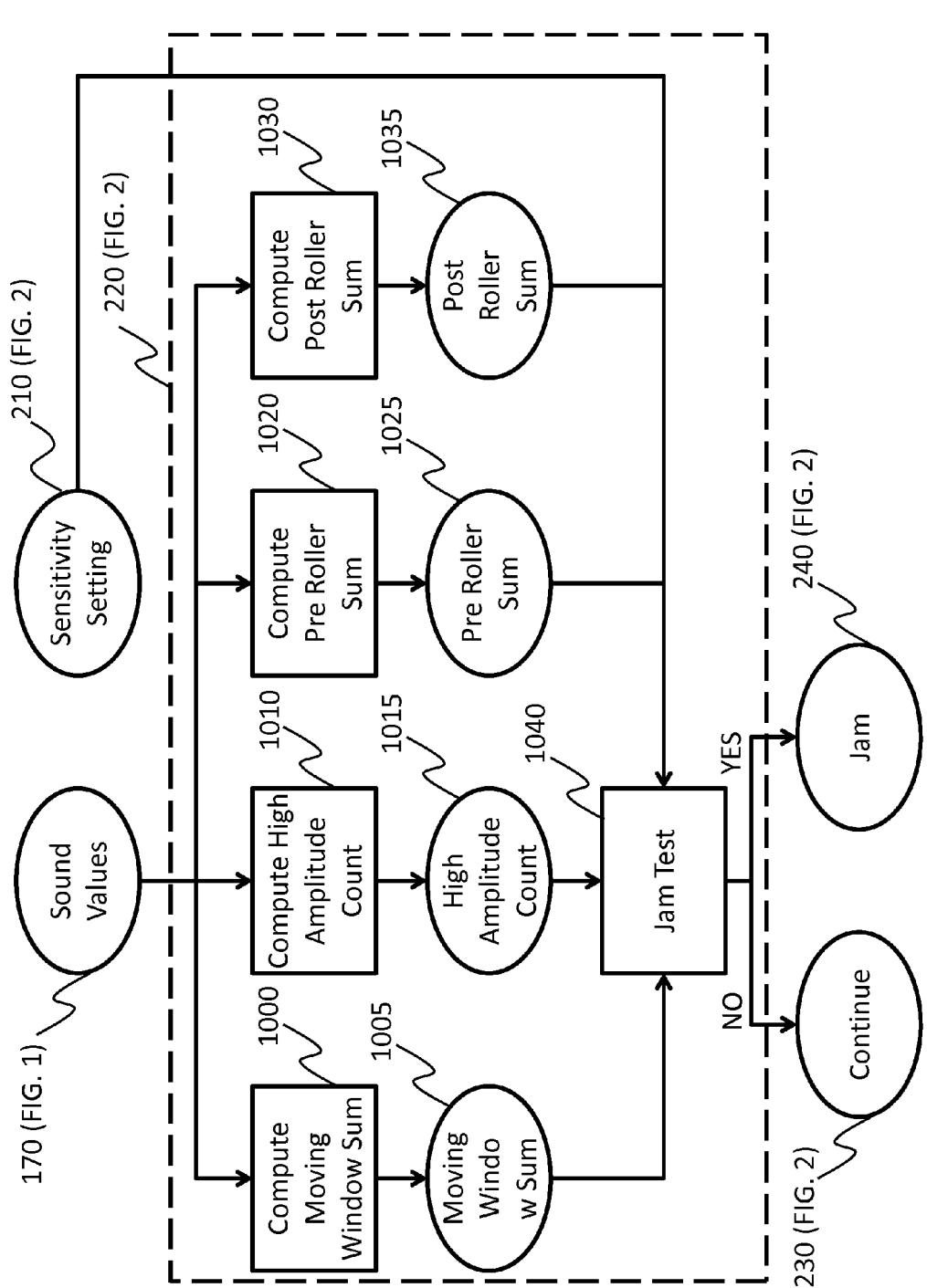
FIG. 10 is a block diagram showing additional details for the detect jam block in FIG. 2 according to an alternate embodiment of present invention.

FIG. 10 is a detailed diagram of the detect jam block 220 (FIG. 2) for an alternate embodiment of the present invention. A compute moving window sum block 1000 produces a moving window sum 1005 from the sound values 170 (FIG. 1). A compute high amplitude count block 1010 produces a high amplitude count 1015 from the sound values 170 (FIG. 1). A compute pre roller sum block 1020 produces a pre roller sum 1025 from the sound values 170 (FIG. 1). A compute post roller sum block 1030 produces a post roller sum 1035 from the sound values 170 (FIG. 1). A jam test block 1040 tests the moving window sum 1005, the high amplitude count 1015, the pre roller sum 1025, and the post roller sum 1035 with the sensitivity setting 210 (FIG. 2) and produces a YES result and indicates a jam 240 (FIG. 2) if a medium jam is detected or a NO result and the medium transport system continues operation 230 (FIG. 2) if a medium jam is not detected.

In FIG. 10 the compute moving window sum block 1000 is as the previously described compute moving window sum block 600 (FIG. 6). The compute high amplitude count block 1010 is as the previously described compute high amplitude count block 620 (FIG. 6). The compute pre roller sum block 1020 computes the pre roller sum 1025 by computing a moving sum of the most recent $N_3$ sound values 170 (FIG. 1) within Region A in FIG. 4 where $N_3$ is typically 500. The compute post roller sum block 1030 is as the previously described compute post roller sum block 640 (FIG. 6).

Figure 11:
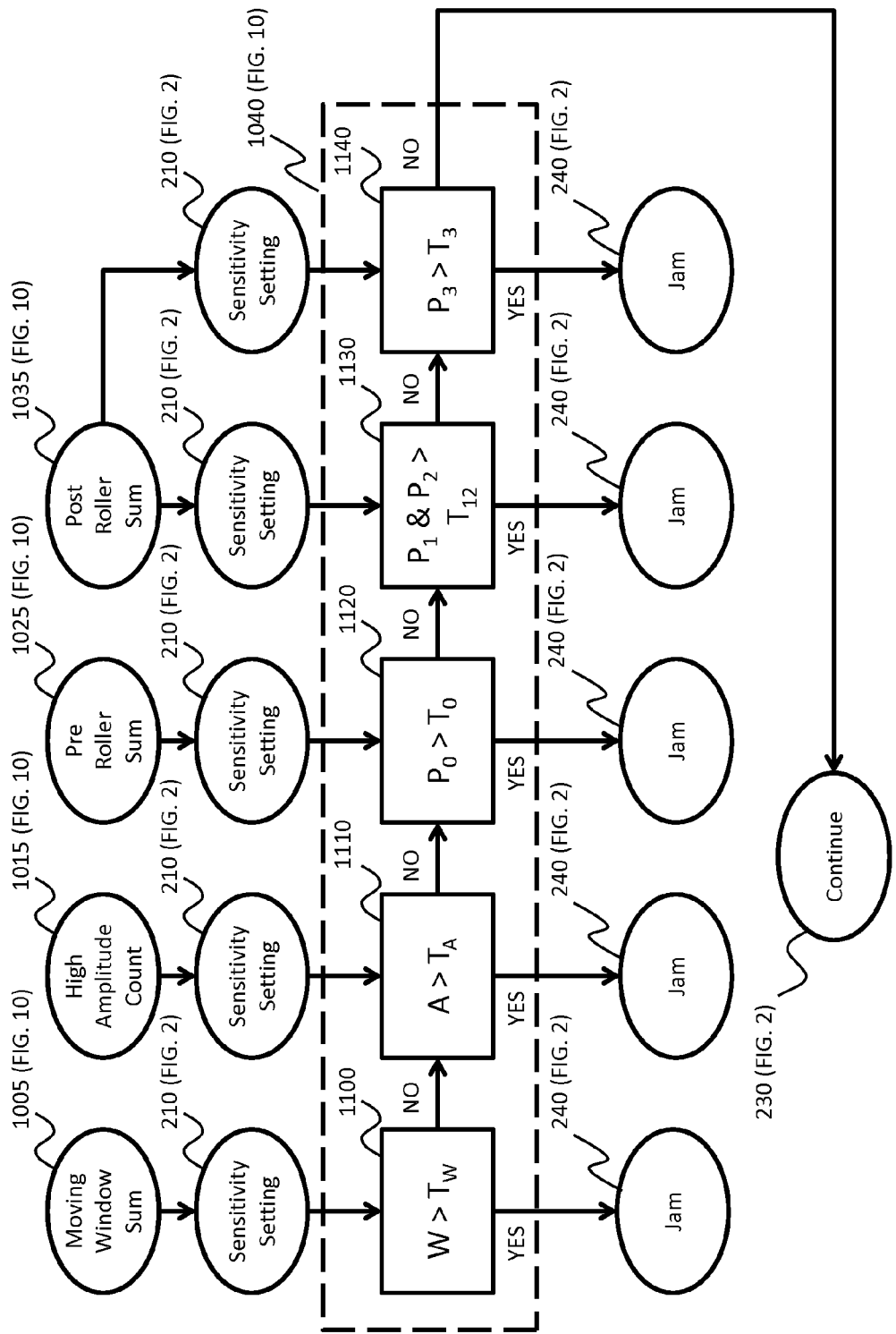
FIG. 11 is a block diagram showing additional details for the jam test block in FIG. 10.

FIG. 11 is a detailed diagram of the jam test block 1040 (FIG. 10). Block 1100 compares the moving window sum, W, 1005 (FIG. 10) to a moving window sum threshold, $T_W$, scaled by the sensitivity setting 210 (FIG. 2). If the moving window sum, W, 1005 (FIG. 10) is greater than the moving window sum threshold, $T_W$, scaled by the sensitivity setting 210 (FIG. 2), a jam 240 (FIG. 2) is indicated. If the moving window sum, W, 1005 (FIG. 10) is not greater than the moving window sum threshold, $T_W$, scaled by the sensitivity setting 210 (FIG. 2), then block 1110 compares the high amplitude count, A, 1015 (FIG. 10) to a high amplitude count threshold, $T_A$, scaled by the sensitivity setting 210 (FIG. 2). If the high amplitude count, A, 1015 (FIG. 10) is greater than the high amplitude count threshold, $T_A$, scaled by the sensitivity setting 210 (FIG. 2), a jam 240 (FIG. 2) is indicated. If the high amplitude count, A, 1015 (FIG. 10) is not greater than the high amplitude count threshold, $T_A$, scaled by the sensitivity setting 210 (FIG. 2), then block 1120 compares the pre roller sum 1025 (FIG. 10) to a pre roller sum threshold, $T_0$, scaled by the sensitivity setting 210 (FIG. 2). If the pre roller sum 1025 (FIG. 10) is greater than the pre roller sum threshold, $T_0$, scaled by the sensitivity setting 210 (FIG. 2), a jam 240 (FIG. 2) is indicated. If the pre roller sum 1025 (FIG. 10) is not greater than the pre roller sum threshold, $T_0$, scaled by the sensitivity setting 210 (FIG. 2), then block 1130 compares the first post roller sum, $P_1$, of the post roller sum 1035 (FIG. 10) and the second post roller sum, $P_2$, of the post roller sum 1035 (FIG. 10) to a first post roller sum threshold, $T_{12}$, scaled by the sensitivity setting 210 (FIG. 2). If the first post roller sum, $P_1$, of the post roller sum 1035 (FIG. 10) and the second post roller sum, $P_2$, of the post roller sum 1035 (FIG. 10) are greater than the first post roller sum threshold, $T_{12}$, scaled by the sensitivity setting 210 (FIG. 2), a jam 240 (FIG. 2) is indicated. If the first post roller sum, $P_1$, of the post roller sum 1035 (FIG. 10) or the second post roller sum, $P_2$, of the post roller sum 1035 (FIG. 10) are not greater than the first post roller sum threshold, $T_{12}$, scaled by the sensitivity setting 210 (FIG. 2), then block 1140 compares the third post roller sum, $P_3$, of the post roller sum 1035 (FIG. 10) to a second post roller sum threshold, $T_3$, scaled by the sensitivity setting 210 (FIG. 2). If the third post roller sum, $P_3$, of the post roller sum 1035 (FIG. 10) is greater than the second post roller sum threshold, $T_3$, scaled by the sensitivity setting 210 (FIG. 2), a jam 240 (FIG. 2) is indicated. If the third post roller sum, $P_3$, of the post roller sum 1035 (FIG. 10) is not greater than the second post roller sum threshold, $T_3$, scaled by the sensitivity setting 210 (FIG. 2), then the medium transport system continues operation 230 (FIG. 2).

Figure 12:
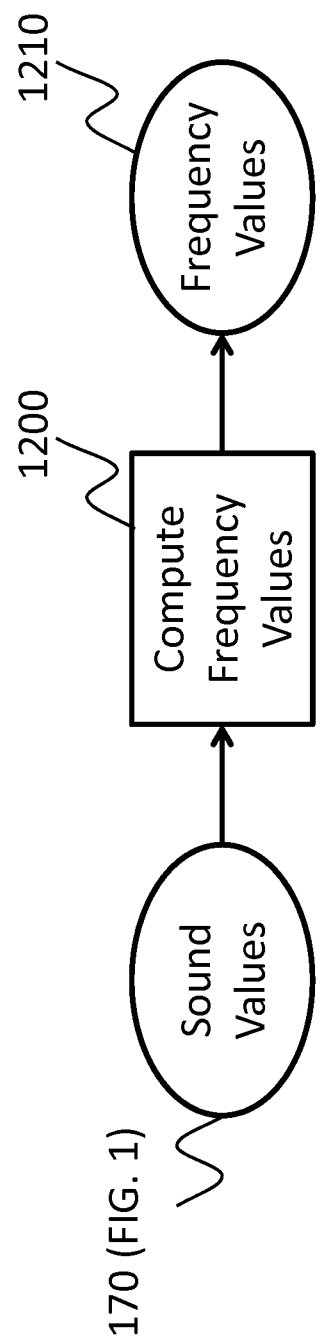
FIG. 12 is a block diagram illustrating a process for computing frequency values according to an embodiment of present invention.

FIG. 12 is a flowchart of a signal processing portion of an alternate embodiment of the present invention. A compute frequency values block 1200 produces frequency values 1210 from the sound values 170 (FIG. 1). The compute frequency values block 1200 produces the frequency values 1210 using Fourier Transform techniques well known in the art. Other ways of computing the frequency values 1210 such as with wavelets will be evident to those skilled in the art.

Figure 13:
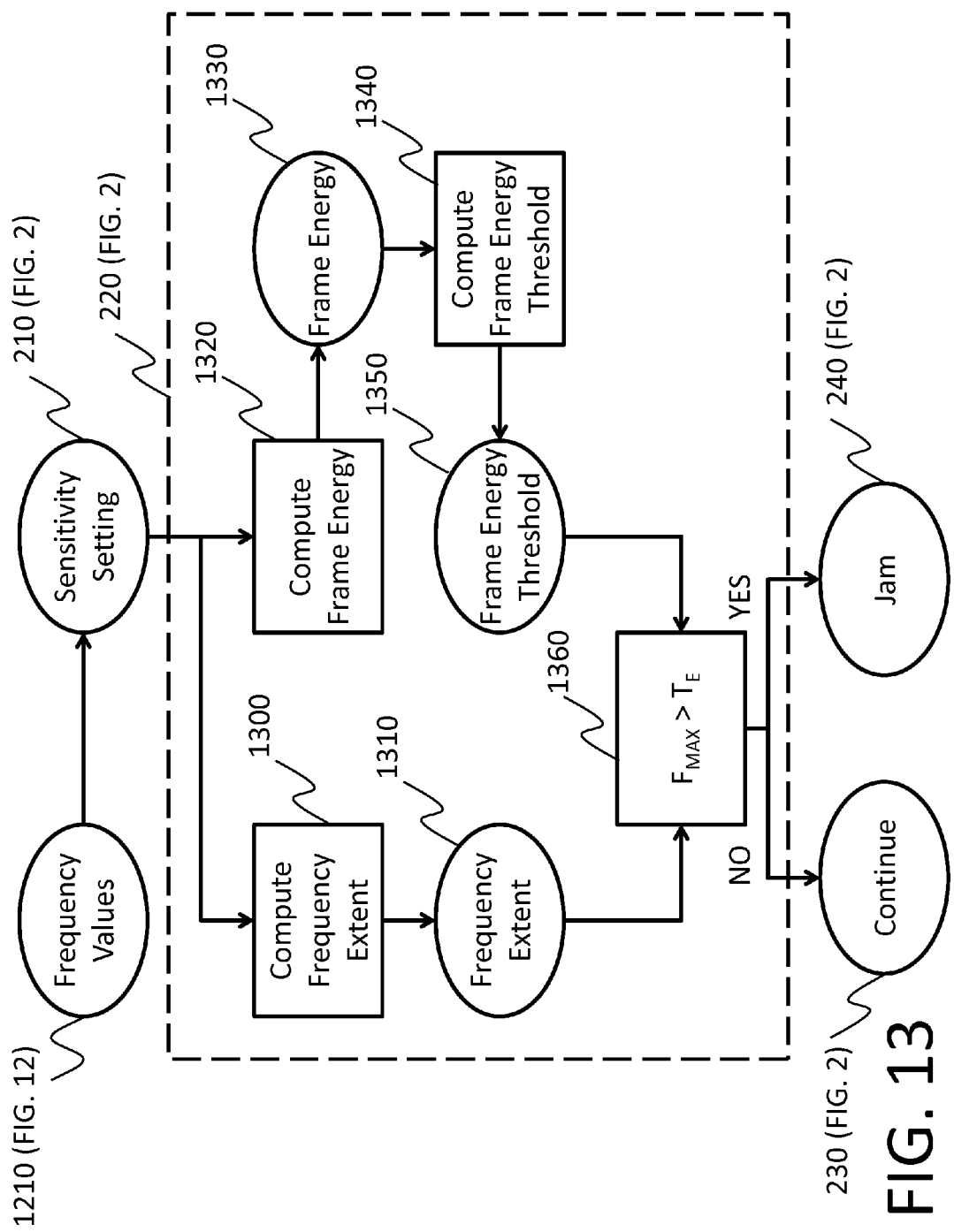
FIG. 13 is a block diagram showing additional details for the detect jam block in FIG. 2 according to an alternate embodiment of present invention.

FIG. 13 is a detailed diagram of the detect jam block 220 (FIG. 2) for an alternate embodiment of the present invention. A compute frequency extent block 1300 produces a frequency extent 1310 from the frequency values 1210 (FIG. 12) and the sensitivity setting 210 (FIG. 2). A compute frame energy block 1320 produces a frame energy 1330 from the frequency values 1210 (FIG. 12) and the sensitivity setting 210 (FIG. 2). A compute frame energy threshold block 1340 produces a frame energy threshold 1350 from the frame energy 1330. Block 1360 tests the frequency extent, $F_{MAX}$, 1310 and the frame energy threshold, $T_E$, 1350 and produces a YES result and indicates a jam 240 (FIG. 2) if $F_{MAX}$ is greater than $T_E$ or a NO result and the medium transport system continues operation 230 (FIG. 2) if $F_{MAX}$ is less than or equal to $T_E$.

In FIG. 13 the compute frequency block 1300 produces the frequency extent 1310 by searching the frequency values 1210 (FIG. 12) that are scaled by the sensitivity setting 210 (FIG. 2) for a lowest frequency with a frequency value less than or equal to a frequency extent threshold. The lowest frequency becomes the frequency extent 1310. The frequency extent threshold is set at the frequency value scaled by the sensitivity setting 210 (FIG. 2) where noise begins to dominate. The compute frame energy block 1320 produces the frame energy 1330 by summing the frequency values 1210 (FIG. 12) that are scaled by the sensitivity setting 210 (FIG. 2) in groups of $N_F$ values where $N_F$ is typically 64. The compute frame energy threshold block 1340 produces the frame energy threshold, $T_E$, 1350 by a linear transform of the frame energy 1330 of the form $T_E$=A×frame energy+B. The coefficients A and B are determined by evaluating a training set of known frequency values for jams and normal feeds and determining the values of A and B that separate the two populations of medium feeds.

Figure 14:
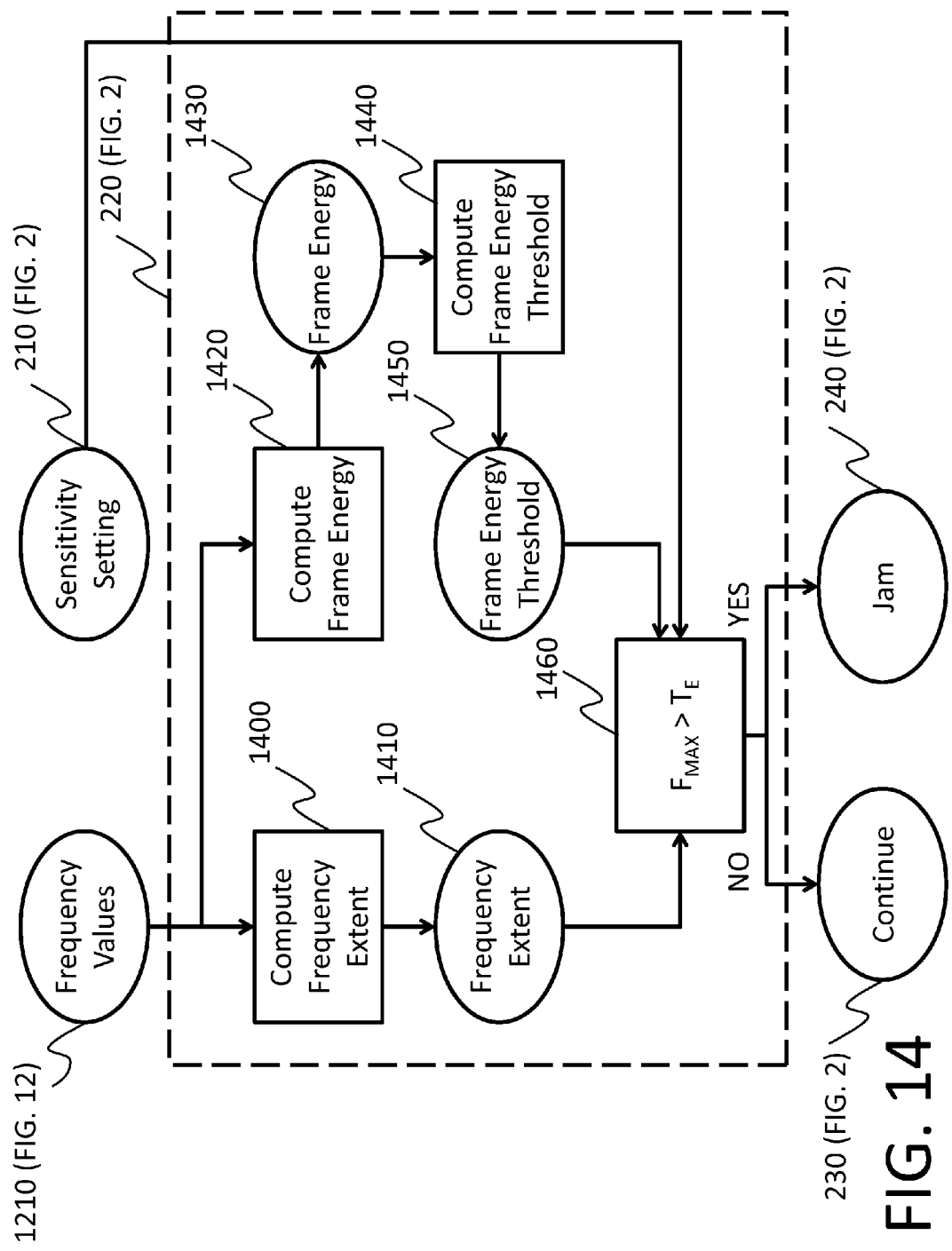
FIG. 14 is a block diagram showing additional details for the detect jam block in FIG. 2 according to an alternate embodiment of present invention.

FIG. 14 is a detailed diagram of the detect jam block 220 (FIG. 2) for an alternate embodiment of the present invention. A compute frequency extent block 1400 produces a frequency extent 1410 from the frequency values 1210 (FIG. 12). A compute frame energy block 1420 produces a frame energy 1430 from the frequency values 1210 (FIG. 12). A compute frame energy threshold block 1440 produces a frame energy threshold 1450 from the frame energy 1430. Block 1460 tests the frequency extent, $F_{MAX}$, 1410 and the frame energy threshold, $T_E$, 1450 scaled by the sensitivity setting 210 (FIG. 2) and produces a YES result and indicates a jam 240 (FIG. 2) if $F_{MAX}$ is greater than $T_E$ scaled by the sensitivity setting 210 (FIG. 2) or a NO result and the medium transport system continues operation 230 (FIG. 2) if $F_{MAX}$ is less than or equal to $T_E$ scaled by the sensitivity setting 210 (FIG. 2).

In FIG. 14 the compute frequency block 1400 produces the frequency extent 1410 by searching the frequency values 1210 (FIG. 12) for a lowest frequency with a frequency value less than or equal to a frequency extent threshold. The lowest frequency becomes the frequency extent 1410. The frequency extent threshold is set at the frequency value where noise begins to dominate. The compute frame energy block 1420 produces the frame energy 1430 by summing the frequency values 1210 (FIG. 12) in groups of $N_F$ values where $N_F$ is typically 64. The compute frame energy threshold block 1440 produces the frame energy threshold, $T_E$, 1450 by a linear transform of the frame energy 1430 of the form $T_E$=A×frame energy+B. The coefficients A and B are determined by evaluating a training set of known frequency values for jams and normal feeds and determining the values of A and B that separate the two populations of medium feeds.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 100 medium transport path
110 medium
120 first roller
130 microphone
140 second roller
150 signal
160 processor
170 sound values
200 compute sensitivity setting block
210 sensitivity setting
220 detect jam block
230 continue
240 jam
300 compute moving window sum block
310 moving window sum
320 compute high amplitude count block
330 high amplitude count
340 compute post roller sum block
350 post roller sum
360 jam test block
400 signal start
500 moving window sum comparison block
510 high amplitude count comparison block
520 first and second post roller sum comparison block
530 third post roller sum comparison block
600 compute moving window sum block
610 moving window sum 620 compute high amplitude count block
630 high amplitude count
640 compute post roller sum block
650 post roller sum
660 jam test block
700 moving window sum comparison block
710 high amplitude count comparison block
720 first and second post roller sum comparison block
730 third post roller sum comparison block
800 compute moving window sum block
805 moving window sum
810 compute high amplitude count block
815 high amplitude count
820 compute pre roller sum block
825 pre roller sum
830 compute post roller sum block
835 post roller sum
840 jam test block
900 moving window sum comparison block
910 high amplitude count comparison block
920 pre roller sum comparison block
930 first and second post roller sum comparison block
940 third post roller sum comparison block
1000 compute moving window sum block
1005 moving window sum
1010 compute high amplitude count block
1015 high amplitude count
1020 compute pre roller sum block
1025 pre roller sum
1030 compute post roller sum block
1035 post roller sum
1040 jam test block
1100 moving window sum comparison block
1110 high amplitude count comparison block
1120 pre roller sum comparison block
1130 first and second post roller sum comparison block
1140 third post roller sum comparison block
1200 compute frequency values block
1210 frequency values
1300 compute frequency extent block
1310 frequency extent
1320 compute frame energy block
1330 frame energy
1340 compute frame energy threshold block
1350 frame energy threshold
1360 frequency extent comparison block
1400 compute frequency extent block
1410 frequency extent
1420 compute frame energy block
1430 frame energy
1440 compute frame energy threshold block
1450 frame energy threshold
1460 frequency extent comparison block

The invention claimed is:

1. A method of indicating a medium misfeed along a medium transport path comprising:
   (a) one or more rollers for conveying the medium along the medium transport path;
   (b) a microphone for detecting the sound of the conveyed medium and producing a signal representing the sound;
   (c) a processor for producing sound values from the signal;
   (d) providing a sensitivity setting responsive to the sound values;
   (e) computing at least one of a moving window sum responsive to the sound values, a high amplitude count responsive to the sound values, a pre roller sum responsive to the sound values, or a post roller sum responsive to the sound values; and
   (f) indicating the medium misfeed responsive to the sensitivity setting, moving window sum, high amplitude count, pre roller sum, or post roller sum.

2. A method of indicating a medium misfeed along a medium transport path comprising:
   (a) one or more rollers for conveying the medium along the medium transport path;
   (b) a microphone for detecting the sound of the conveyed medium and producing a signal representing the sound;
   (c) a processor for producing sound values from the signal; and
       (i) providing a sensitivity setting responsive to the sound values;
       (ii) computing a moving window sum responsive to the sound values;
       (iii) computing a high amplitude count responsive to the sound values;
       (iv) computing a pre roller sum responsive to the sound values;
       (v) computing a post roller sum responsive to the sound values; and
   (d) indicating the medium jam responsive to the sensitivity setting, moving window sum, high amplitude count, pre roller sum, or post roller sum.

3. The method of claim 2 wherein (c) (ii) includes computing the sum of sound values using a given window width.

4. The method of claim 2 wherein (c) (iii) includes computing the sum of sound values that are greater than a high amplitude sound threshold value.

5. The method of claim 2 wherein (c) (iv) includes computing a sum of sound values from a region of the medium transport path before one of the rollers.

6. The method of claim 2 wherein (c) (v) includes computing a sum of sound values from a region of the medium transport path after one of the rollers.

7. The method of claim 2 wherein (d) includes indicating a medium jam responsive to a moving window sum threshold value, a high amplitude count threshold value, a pre roller sum threshold value, or a post roller sum threshold value.

8. A method of indicating a medium misfeed along a medium transport path comprising:
   (a) one or more rollers for conveying the medium along the medium transport path;
   (b) a microphone for detecting the sound of the conveyed medium and producing a signal representing the sound;
   (c) a processor for producing sound values from the signal; and
       (i) providing a sensitivity setting responsive to the sound values;
       (ii) providing frequency values from the sound values;
       (iii) computing a frequency extent responsive to the frequency values; and
       (iv) computing a frame energy responsive to the frequency values;
   (d) indicating the medium jam responsive to the sensitivity setting, frequency extent, or frame extent.

9. The method of claim 8 wherein (c) (iii) includes computing a frequency above a frequency extent threshold value.

10. The method of claim 8 wherein (c) (iv) includes computing the sum of frequency values using a given frame width.

11. The method of claim 8 wherein (d) includes indicating a medium jam responsive to a frequency extent threshold value, or a frame energy threshold value.

* * * * *